(No Model.)  2 Sheets—Sheet 1.

E. C. SCHROEDER.
COMBINED POTATO MARKER, HILLER, AND DIGGER.

No. 316,403.  Patented Apr. 21, 1885.

Witnesses:
O. C. Yates
A. E. Garnet

Inventor:
Ernest Charles Schroeder (No Model.) 2 Sheets—Sheet 2.
E. C. SCHROEDER.
COMBINED POTATO MARKER, HILLER, AND DIGGER.
No. 316,403. Patented Apr. 21, 1885.
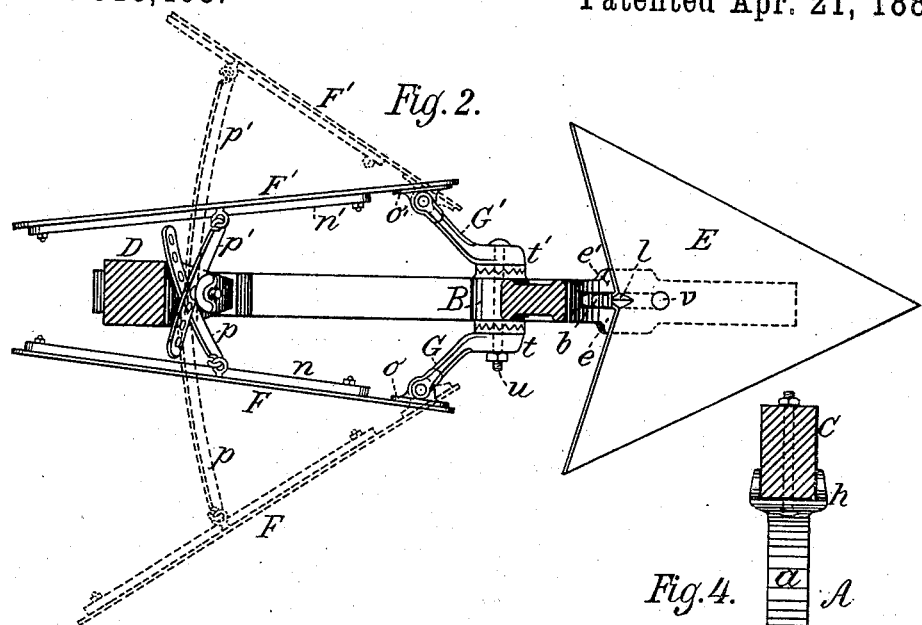
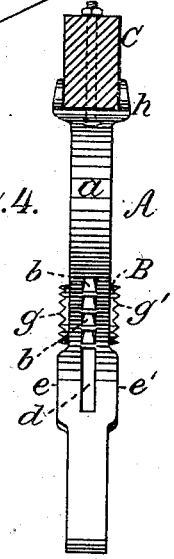
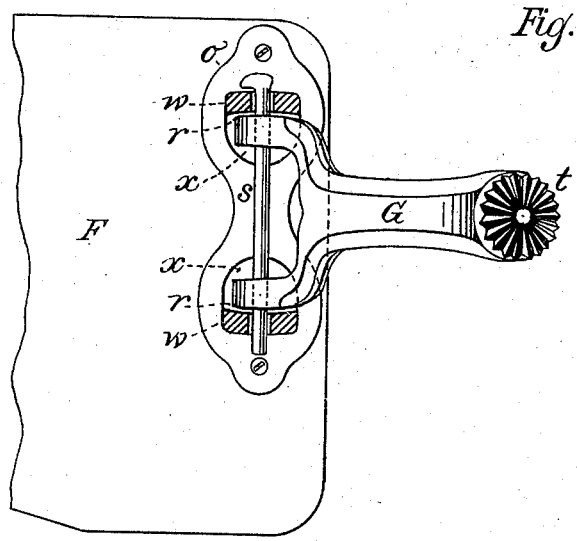
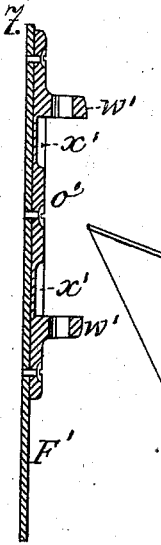
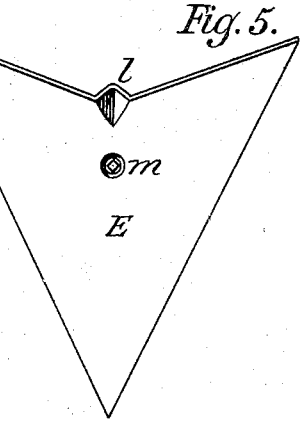
Witnesses:
O. C. Yates.
A. E. Gannt
Inventor:
Ernest Charles Schroeder

UNITED STATES PATENT OFFICE.

ERNEST CHARLES SCHROEDER, OF ITASKA, ILLINOIS.

COMBINED POTATO MARKER, HILLER, AND DIGGER.

SPECIFICATION forming part of Letters Patent No. 316,403, dated April 21, 1885.

Application filed May 9, 1884. (No model.)

*To all whom it may concern:*

Be it known that I, ERNEST CHARLES SCHROEDER, of Itaska, in the county of Du Page and State of Illinois, have invented new and useful Improvements in a Combination Plow consisting of Potato Marker, Hiller, and Digger, of which the following is a specification.

My invention relates to improvements in an agricultural implement; and it consists of a plow comprising a combination of mechanical parts, which renders the same suitable for marking furrows for planting, hilling, and extracting potatoes. The plow is of simple pattern, durable, easy and light to handle, and by changing the arrangement of some of its movable parts the same is readily converted from its first introduction.

The different matters of improvement will be more clearly defined in the claims, and relate chiefly to construction.

Figure 1:
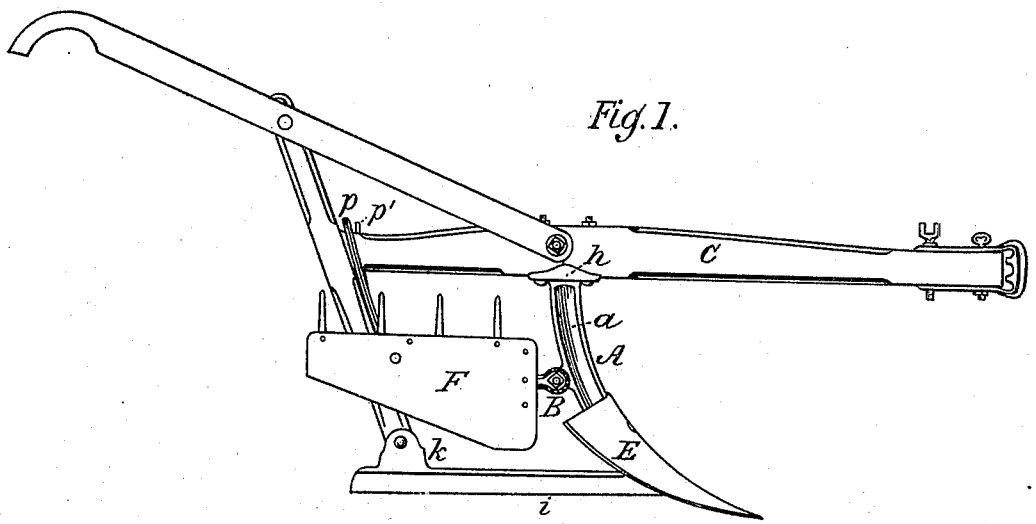
Figure 3:
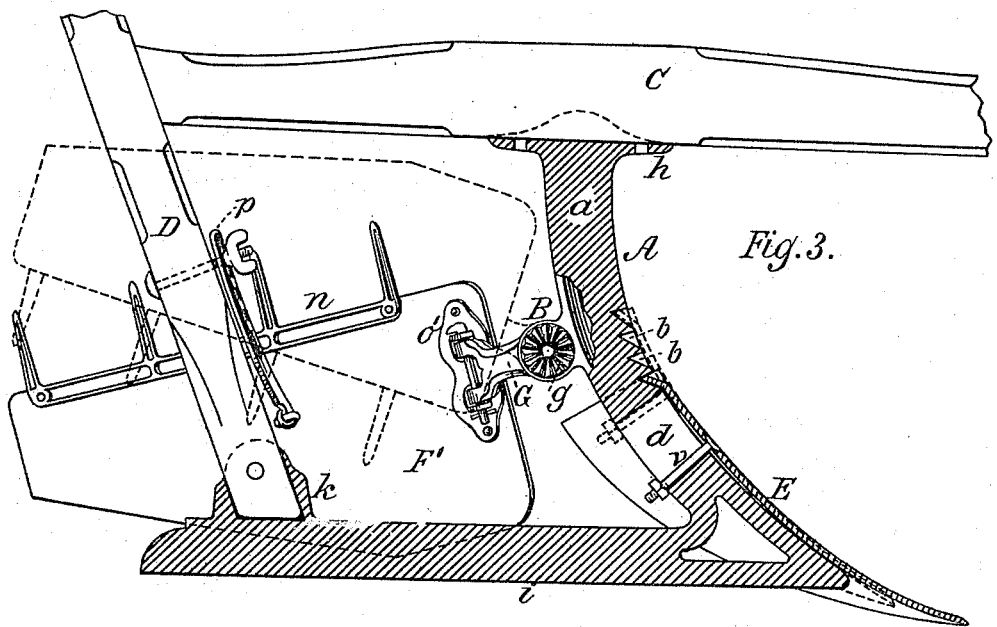

I refer to the accompanying drawings, in which Figure 1 represents the plow in side elevation and in the position for laying off furrows. Fig. 2 is a top view of the same with expanded wings, as represented in dotted lines. Fig. 3 represents a longitudinal section in relation to Fig. 1, but on an enlarged scale, showing the different positions of the wings and shovel when the implement is used as a hiller or digger, the latter position indicated by dotted lines. Fig. 4 is a front view of the share-beam, and Fig. 5 is a front view of the plow-shovel. Fig. 6 shows in detail one of the two coupling-arms connected with the hinge on the wing, and Fig. 7 represents a vertical section taken on line of center of the hinge.

In explaining my invention I refer particularly to Figs. 3 and 4 of the drawings, which illustrate fully the improved features of the implement. The curved share-beam $a$ of the shoe A has in equidistant intervals corresponding inclined recesses, $b\ b$, followed subsequently by a slotted portion, $d$, which is in extent equal to the accumulated space of the former, and is provided with sidewise-projecting flanges $e\ e'$, for supporting the shovel and properly securing the same in the adjusted position. The rear part of the share-beam, opposite the recesses, carries an embodied projecting cylindrical head, B, with a bolt-hole in center, and radially-grooved faces $g\ g'$, for connection with the coupling-arms. The top part of the share-beam terminates in a flanged support, $h$, for the reception and securing the draft-beam C of the plow, while the lower extension or foot, $i$, of the shoe has near its end a recessed projecting part, $k$, for securing the standard D in position relative to its connection with the draft-beam.

The plow-shovel E is, as usually, triangular-shaped, slightly raised in the center, sloping sidewise, and curving in its extension toward the point, having between the angular bearings of the top part, in line of center of the shovel, a V-shaped projecting hook, $l$, from the surface of the metal, raised by way of impression, intended to fit and butt in the recesses $b\ b$. Below the said hook $l$, coinciding with the slotted part $d$, the shovel is perforated with a square and countersunk hole, $m$, for the reception of a fitting screw-bolt, $v$, for rigidly securing the same to the share-beam.

The wings F F' are made of sheet metal, of even surface and proper size, but irregular in shape. The ends are in right angle to the base, with a tapering top part, and provided on their inner sides, at the base, with a rake, $n\ n'$, its teeth uniformly projecting to a certain extent. The front parts are mounted with hinges $o\ o'$, while near the center portion each wing carries on a hook a bended brace-bar, $p\ p'$, of sufficient length to reach the standard D, for fastening, said brace-bars having a series of holes for adjusting the spread of the wings each independently from the other, and secured in their respective positions by a thumb-screw passing through the center of the standard.

G G' are curved coupling-arms connecting the wings with the cylindrical head B of the share-beam, and bent for the purpose of keeping the front part of the wings within the width of the shovel. The bifurcated rear ends of the arms are rounded at $r\ r'$, and have center holes for the reception of a pin, $s$. The front part of the arms terminate in friction-collars $t$ and $t'$, the same provided with center holes for engaging with and turning vertically on the cylindrical head B in any required direction, secured by a tightening screw-bolt, $u$.

The hinges $o\ o'$ are identically constructed in their upper and lower parts, and provided with lugs $w\ w'$, projecting from the base of a cavity, $x\ x'$, purposely caved to allow the bifurcated part of the arms G G' to turn freely in the same, and the inner surface of the lugs is correspondingly arched to fit the curved or rounded parts $r\ r'$ of the bifurcated part of the arms, and provided with similar center holes, but larger in diameter, allowing the pin $s$, which connects the arm to the hinge, to play in same, the aforesaid curvature of the bifurcated parts of the arms and the lugs allowing an oscillating movement in any direction, imparting a rocking motion to the wings, partially evading the concussion caused by obstacles encountered, and causing the bearing strain to be thrown off the center of the friction-collars of the arms.

The plow is used in the first instance as a "marker," as shown in Fig. 1 of the drawings, for laying off the furrows, and for this object the hinged wings are turned up and drawn closely together at their ends, and held in position by the brace-bars secured by the thumb-screw on the standard, the rakes and teeth turned upward to be out of the way, and can be readily changed from a marker into a "hiller" by turning the arms downward and expanding the wings in position to their utmost capacity by the supporting-braces. This operation brings the front ends of the wings nearer together within the space of the shovel for the purpose of assisting in conveying to the hills and covering the vegetable with the soil turned up by the shovel or any earth accidentally carried over the top of the same, leaving a level unobstructed furrow, affording a thorough drainage, as shown in Fig. 3 by full lines.

In using the implement for a "digger," the wings are detached from the arms by removing the pins, then interchanged and fastened again to the same, by which operation the rakes and teeth are reversed to the marker. To perform the work designated, the wings are expanded as in the hiller, but their rear part elevated by adjusting the arms at the cylindrical head, as shown in Fig. 3 by dotted lines.

The shovel in the marker and hiller is set in any suitable low position, in the former according to the proposed depth of the furrows, and in the latter in turning the soil between the furrows sufficient to perform the functions of a hiller. When the implement is required to serve as a digger, the shovel is brought up in the highest recess, and consequently steep in position, its point projecting in an acute angle below the toe of the shoe, which forces the shovel below, causing the extraction of the vegetable. The shovel in all these defined situations is held in place by tightening the screw-bolt which passes through the blade and slotted space of the share-beam. The shovel rests with its sloping sides against the flanged part, causing a space between the same and the share-beam, at the same time causing the angular hooked part to butt in the required recess.

I claim—

1. In a plow adapted for marking, hilling, and digging potatoes, the shoe A, constructed, substantially as herein described, with front recesses, $b\ b$, slotted part $d$, and projecting side flanges, $e\ e'$, on the standard or share-beam $a$, the same also provided on its rear part with a projecting cylindrical head, B, having on its sides radial grooves $g\ g'$ and on its top part a flanged support, $h$, and on the foot $i$ of the shoe a projecting recessed part, $k$, as and for the purpose specified.

2. In combination with the cylindrical head B of the share-beam $a$, the curved arms G G', having bifurcated rear ends, the same arched at $r\ r'$, their front parts shaped into friction-collars $t\ t'$, substantially as described, and for the purpose specified.

3. In combination with arms G G', secured to the share-beam $a$, the hinges $o\ o'$, fastened to the wings F F', having curved lugs $w\ w'$, the same rising from the base of a cavity, $x\ x'$, in the metal, and provided with center holes, substantially as described, and for the purpose specified.

4. In combination with the hinges $o\ o'$, arms G G', fastened to cylindrical head B, and the wings F F', each mounted with rakes $n\ n'$ and brace-bars $p\ p'$, said wings being interchangeable, substantially as described, and for the purpose specified.

In testimony whereof I have set my hand in the presence of two subscribing witnesses.

ERNEST CHARLES SCHROEDER.

Witnesses:
ELIJAH SMITH,
FRANK A. SMITH.